(12) United States Patent
Steinmetz et al.

(10) Patent No.: US 11,046,866 B2
(45) Date of Patent: Jun. 29, 2021

(54) METHOD FOR PRODUCING A COATING SYSTEM WITH AN AQUEOUS BASECOAT

(71) Applicant: BASF COATINGS GMBH, Münster (DE)

(72) Inventors: Bernhard Steinmetz, Muenster (DE); Peter Hoffmann, Muenster (DE); Hardy Reuter, Muenster (DE); Peggy Jankowski, Wuerzburg (DE)

(73) Assignee: BASF Coatings GmbH, Münster (DE)

( * ) Notice: Subject to any disclaimer, the term of this patent is extended or adjusted under 35 U.S.C. 154(b) by 135 days.

(21) Appl. No.: 16/327,407

(22) PCT Filed: Aug. 14, 2017

(86) PCT No.: PCT/EP2017/070597
§ 371 (c)(1),
(2) Date: Feb. 22, 2019

(87) PCT Pub. No.: WO2018/036855
PCT Pub. Date: Mar. 1, 2018

(65) Prior Publication Data
US 2019/0194490 A1 Jun. 27, 2019

(30) Foreign Application Priority Data
Aug. 24, 2016 (EP) ..................................... 16185538

(51) Int. Cl.
| | | |
|---|---|---|
| C09D 171/02 | (2006.01) | |
| C09D 175/16 | (2006.01) | |
| C08G 18/34 | (2006.01) | |
| C08G 18/10 | (2006.01) | |
| C08G 18/81 | (2006.01) | |
| C08G 65/332 | (2006.01) | |
| C08G 18/32 | (2006.01) | |
| C09D 167/00 | (2006.01) | |
| C09D 167/02 | (2006.01) | |
| C08G 18/66 | (2006.01) | |
| C08G 18/75 | (2006.01) | |
| C08G 63/672 | (2006.01) | |
| C08G 63/688 | (2006.01) | |
| C09D 7/65 | (2018.01) | |
| C08G 63/668 | (2006.01) | |
| C08G 18/42 | (2006.01) | |
| C09D 187/00 | (2006.01) | |

(52) U.S. Cl.
CPC ........... *C09D 171/02* (2013.01); *C08G 18/10* (2013.01); *C08G 18/3271* (2013.01); *C08G 18/348* (2013.01); *C08G 18/4288* (2013.01); *C08G 18/6659* (2013.01); *C08G 18/755* (2013.01); *C08G 18/8108* (2013.01); *C08G 63/668* (2013.01); *C08G 63/672* (2013.01); *C08G 63/6884* (2013.01); *C08G 65/332* (2013.01); *C08G 65/3328* (2013.01); *C09D 7/65* (2018.01); *C09D 167/00* (2013.01); *C09D 167/025* (2013.01); *C09D 175/16* (2013.01); *C09D 187/005* (2013.01); *C08G 2150/00* (2013.01)

(58) Field of Classification Search
None
See application file for complete search history.

(56) References Cited

U.S. PATENT DOCUMENTS

| | | |
|---|---|---|
| 3,459,584 A | 8/1969 | Caldwell |
| 6,008,286 A | 12/1999 | Groves |
| 9,193,822 B2 | 11/2015 | Nefzger et al. |

(Continued)

FOREIGN PATENT DOCUMENTS

| | | |
|---|---|---|
| CN | 1131257 C | 12/2003 |
| CN | 104293123 A | 1/2015 |

(Continued)

OTHER PUBLICATIONS

European Search Report for EP Patent Application No. 16185538.2, dated Feb. 6, 2017, 3 pages.

(Continued)

*Primary Examiner* — Shamim Ahmed
*Assistant Examiner* — Bradford M Gates
(74) *Attorney, Agent, or Firm* — Armstrong Teasdale LLP

(57) ABSTRACT

Described herein is a method for producing a coating system on a substrate, including producing a cured basecoat film on the substrate by applying a pigmented aqueous basecoat material to the substrate and subsequently curing the basecoat material, wherein the basecoat material includes a polyether-based reaction product which is preparable by reaction of (a) at least one cyclic tetracarboxylic dianhydride having an aliphatic, aromatic or araliphatic radical X which bridges the two anhydride groups, with (b) at least one polyether of a general structural formula (II)

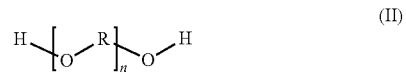

in which
R is a $C_3$ to $C_6$ alkylene radical and n is selected such that the polyether (b) possesses a number-average molecular weight of 500 to 5000 g/mol,
and wherein components (a) and (b) are used in the reaction in a molar ratio of 0.7/2.3 to 1.6/1.7 and a resulting reaction product possesses an acid number of 5 to 80 mg KOH/g.

15 Claims, No Drawings

(56) References Cited

U.S. PATENT DOCUMENTS

| | | | |
|---|---|---|---|
| 2006/0188735 A1* | 8/2006 | Reising | C09D 167/00 428/458 |
| 2009/0275680 A1* | 11/2009 | Bruchmann | C09D 167/00 524/31 |
| 2012/0097194 A1* | 4/2012 | McDaniel | A01N 63/10 134/26 |
| 2014/0005332 A1* | 1/2014 | Lindekens | C09D 11/101 524/604 |
| 2014/0302307 A1* | 10/2014 | Steinmetz | C09D 175/16 428/323 |
| 2015/0024213 A1 | 1/2015 | Chiang et al. | |
| 2015/0044450 A1 | 2/2015 | Yuasa et al. | |
| 2016/0319151 A1 | 11/2016 | Steinmetz et al. | |
| 2017/0137666 A1 | 5/2017 | Steinmetz et al. | |

FOREIGN PATENT DOCUMENTS

| | | |
|---|---|---|
| DE | 1998004 U | 12/1968 |
| DE | 4009858 A1 | 10/1991 |
| DE | 4437535 A1 | 4/1996 |
| DE | 19914896 A1 | 10/2000 |
| DE | 19930665 A1 | 1/2001 |
| DE | 10043405 C1 | 6/2002 |
| DE | 19948004 A1 | 7/2002 |
| EP | 0228003 A1 | 7/1987 |
| EP | 0546375 A2 | 6/1993 |
| EP | 0634431 A1 | 1/1995 |
| EP | 1534792 B1 | 6/2005 |
| JP | 2014159509 A | 9/2014 |
| RU | 2160297 C2 | 12/2000 |
| RU | 2522644 C2 | 7/2014 |
| RU | 2546123 C2 | 4/2015 |
| RU | 2592895 C2 | 7/2016 |
| WO | 9115528 A1 | 10/1991 |
| WO | 9215405 A1 | 9/1992 |
| WO | 2004085558 A1 | 10/2004 |
| WO | 2014033135 A2 | 3/2014 |
| WO | 2015091194 A1 | 6/2015 |
| WO | 2015091204 A1 | 6/2015 |
| WO | 2016000947 A1 | 1/2016 |
| WO | 2016000949 A1 | 1/2016 |

OTHER PUBLICATIONS

International Search Report for International Application No. PCT/EP2017/070597, dated Sep. 7, 2017, 2 pages.

* cited by examiner

METHOD FOR PRODUCING A COATING SYSTEM WITH AN AQUEOUS BASECOAT

CROSS-REFERENCE TO RELATED APPLICATIONS

This application is a U.S. National Phase Application of PCT/EP2017/070597, filed Aug. 14, 2017, which claims the benefit of priority to European Patent Application No. 16185538.2, filed Aug. 24, 2016, the entire contents of which are hereby incorporated by reference herein.

FIELD OF INVENTION

The present invention relates to an innovative method for producing a coating system using an aqueous basecoat material. This aqueous basecoat material comprises carboxy-functional, polyether-based reaction products which are prepared using cyclic tetra-carboxylic dianhydrides. The present invention also relates to the coating systems producible by means of said method.

BACKGROUND

A multitude of methods are known for producing multicoat color and/or effect paint systems (also called multilayer coatings or multilayer paint systems). Known from the prior art (compare, for example, German patent application DE 199 48 004 A1, page 17, line 37, to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]), for example, is the following method, wherein
(1) a pigmented aqueous basecoat material is applied to a substrate,
(2) a polymer film is formed from the coating material applied in stage (1),
(3) a clearcoat material is applied to the resulting basecoat film, and subsequently
(4) the basecoat film is cured together with the clearcoat film.

This method is widely used, for example, both for the OEM (original) finishing of automobiles and also for the finishing of metal and plastic ancillary components. The present-day requirements regarding the performance properties of such coating systems (coatings) are massive.

Furthermore, automakers will endeavor to make the OEM finishing of vehicle bodies as economical as possible. One approach to this is the effective saving of coating material by denying application of a clearcoat material to particular regions of the vehicle bodies. Such regions are situated in the interior of the body, examples being the interior of the trunk compartment or regions such as the passenger compartment and the engine compartment. The reason is that in these regions, the protective effect provided primarily by the clearcoat finish, namely protection from environmental effects such as UV radiation or moisture, is not of primary importance.

And yet the clearcoat finish also contributes to the mechanical stability of the overall painting system, including, for example, to the hardness and adhesion of the system. The deliberate omission of the clearcoat finish makes it difficult to achieve the automakers' specifications in this regard. The reason is that in these regions, the basecoat system is then the uppermost coat in the coating system and is exposed directly to the mechanical challenges of everyday service.

A complicating factor is that, for technical reasons, the basecoat material for application in these regions is of course the same basecoat material which is also applied to the rest of the vehicle body and is later on recoated with a clearcoat material. It is therefore not possible to adapt basecoat materials specifically for the regions described.

The situation becomes even more challenging when, for saving on energy and on coats, the coating system is to undergo only low-temperature curing. Through the use of two-component clearcoat materials for producing the uppermost coat of a multicoat system, accordingly, it is possible frequently to carry out curing at temperatures of below 120° C., for example, and in this way to obtain an overall system which meets the specifications. Once again, however, for technical reasons, in this case the abovementioned regions of the interior are likewise subjected only to the comparatively low curing temperatures. It then becomes all the more difficult to achieve an appropriate mechanical profile for the regions in which the basecoat material forms the uppermost coating. This is especially true when using basecoat materials formulated as one-component paints, in other words paints in which a crosslinking agent present is not used in a curing component for separate production that is not combined with the base component until shortly before application, but wherein instead, the paint can be produced and supplied as one component. Corresponding advantages of such one-component systems lie of course in greater ease of handling, storage, transport, and use.

EP 0 546 375 B1 discloses aqueous dispersions comprising a polyurethane, constructed from components including organic polyisocyanates and dihydroxyl compounds having at least two carboxylic acid or carboxylate groups in the molecule, prepared by reaction of dihydroxyl compounds with tetracarboxylic dianhydrides, and the use of these dispersions for producing coatings, and articles such as leathers, textiles, and cotton that are coated with these dispersions. The coatings produced from the polyurethane resin dispersions exhibit reduced water swellability.

The problem underlying the present invention was that of providing a method for producing a coating system using a basecoat material, wherein the coating film produced using the basecoat material does not require recoating with a further coating material, especially a clearcoat material, in order to produce an overall system which is capable of meeting usual specifications on mechanical resistance, especially adhesion.

DESCRIPTION

The stated problems have been solved by a method for producing a coating system on a substrate, comprising
producing a cured basecoat film on the substrate by applying a pigmented aqueous basecoat material to the substrate and subsequently curing the basecoat material,
where
the pigmented aqueous basecoat material comprises a carboxy-functional polyether-based reaction product which is preparable by reaction of
(a) at least one cyclic tetracarboxylic dianhydride having an aliphatic, aromatic or araliphatic radical X which bridges the two anhydride groups,
with
(b) at least one polyether of the general structural formula (II)

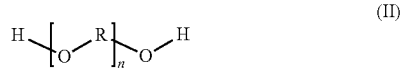

(II)

in which

R is a $C_3$ to $C_6$ alkylene radical and n is selected such that the polyether (b) possesses a number-average molecular weight of 500 to 5000 g/mol, where components (a) and (b) are used in the reaction in a molar ratio of 0.7/2.3 to 1.6/1.7 and the resulting reaction product possesses an acid number of 5 to 80 mg KOH/g, and where the cured basecoat film represents at least partially the uppermost coat of the coating system produced.

The new method is also referred to below as the method of the invention. Preferred embodiments of the method of the invention will become apparent from the description hereinafter and also from the dependent claims.

Likewise a subject of the present invention is a coating system, more particularly a multicoat paint system, producible by the method of the invention.

The method of the invention enables the production of coating systems in which the uppermost coat is based on a basecoat material, but nevertheless need not be recoated with a clearcoat material in order to produce an overall system which meets typical specifications with regard to mechanical resistance, especially adhesion.

The condition where n is selected such that said polyether possesses a number-average molecular weight of 500 to 5000 g/mol may be illustrated as follows: where, for example, R is a tetramethylene radical and the number-average molecular weight is to be 1000 g/mol, n is on average between 13 and 14. From the mandates imposed, the skilled person is readily able to select and produce a corresponding reaction product. Aside from this, the examples and the description later on below provide additional information. The parameter n, therefore, just like the number-average molecular weight, should be understood as a statistical average value.

The wording "at least partially" is understood as follows: the paint system produced on the substrate may have regions in which at least one further coating film, as for example a clearcoat film, is disposed above (that is, on the side facing away from the substrate) the basecoat film. In every case, however, a subregion of the coating system is designed in such a way that the basecoat film represents the uppermost coat—in other words, the basecoat film is not recoated with one or more further coating films. A system of this kind is found, for example, in an automobile body as already described at the outset, in which regions situated in the interior of the body, such as the interior of the trunk compartment or interior regions of the passenger compartment and of the engine compartment, are not recoated with a clearcoat material.

Pigmented Aqueous Basecoat Material

The method of the invention requires the use of a specific pigmented aqueous basecoat material.

A basecoat material is in principle a color-imparting intermediate coating material which is used in automotive finishing and general industrial coating. It is generally applied to a metal or plastics substrate which has been pretreated with a baked (fully cured) surfacer or primer-surfacer, and occasionally is also applied directly to the plastics substrate. Additionally, existing paint systems, which may also require pretreatment (by sanding, for example), may serve as substrates. It is nowadays entirely customary for more than one basecoat film to be applied. In such a case, accordingly, a first basecoat film constitutes the substrate for a second. It is possible here in particular, rather than application to a coat of a baked primer-surfacer, for the first basecoat material to be applied directly to a metal substrate that is provided with a cured electrocoat film, and for the second basecoat material to be applied directly to the first basecoat film without the latter being separately cured.

In order to provide a basecoat film with protection in particular from environmental effects, at least one additional clearcoat film is generally applied over the basecoat film. This is done in general by the wet-on-wet method, meaning that the clearcoat material is applied without the basecoat film or films being cured. Curing then takes place at the end, jointly. Also now widespread is the production of only one basecoat film on a cured electrocoat film, followed by application of a clearcoat material and then by joint curing of these two films.

A feature particular to the method of the invention is that the basecoat material to be used, while having the above-described qualities of a color-imparting coating material and being also suitable as an intermediate coating material, nevertheless serves at least partially for producing the uppermost coat in the paint system to be produced. In other words, the coat in question is specifically not recoated with a clearcoat material in the customary fashion.

The aqueous pigmented basecoat material for use in the method of the invention comprises at least one specific carboxy-functional, polyether-based reaction product. This product is described first.

The reaction products to be used may be prepared using (a) cyclic tetracarboxylic dianhydrides having an aliphatic, aromatic or araliphatic radical X which bridges the two anhydride groups.

Cyclic tetracarboxylic dianhydrides, as is known, are organic molecules which can contain two carboxylic anhydride groups, with each of the two carboxylic anhydride groups being part of a cyclic group in the molecule. The molecule therefore has at least two cyclic groups, there being in any case two cyclic groups in each of which an anhydride group is present. This form of the arrangement of anhydride groups automatically means that the ring-opening reaction of an anhydride group, with a hydroxyl group, for example, does not cause the molecule to break down into two molecules, but instead that only one molecule is present even after ring opening. Typical and also readily available and known organic compounds having corresponding anhydride groups often contain these very anhydride groups in the form of a five-membered ring. Cyclic tetracarboxylic dianhydrides in which the two anhydride groups are present in a five-membered ring are therefore logically preferred in the context of the present invention. An example that may be given is pyromellitic dianhydride, the dianhydride of pyromellitic acid.

The radical X which bridges the anhydride groups may be aliphatic, aromatic or araliphatic (mixed aromatic-aliphatic) in nature. It bridges the two carboxylic anhydride groups each present in a cyclic group, and is therefore a tetravalent radical. The radical X preferably contains 4 to 40 carbon atoms, more particularly 4 to 27 carbon atoms.

An aliphatic compound is a saturated or unsaturated organic compound (that is, a compound containing carbon and oxygen) which is not aromatic and not araliphatic. An aliphatic compound may for example consist exclusively of carbon and hydrogen (aliphatic hydrocarbon) or as well as carbon and hydrogen may also contain heteroatoms in the form of bridging or terminal functional groups and/or molecular moieties, identified later on below. Furthermore, therefore, the term "aliphatic compound" embraces both cyclic and acyclic aliphatic compounds, and is understood as a corresponding generic term in the context of the present invention as well.

Acyclic aliphatic compounds may be straight-chain (linear) or branched. Linear in this context means that the compound in question has no branches in relation to the carbon chain, the carbon atoms instead being arranged exclusively in linear sequence in one chain. Branched or nonlinear for the purposes of the present invention therefore means that the respective compound exhibits branching in the carbon chain; in other words, then, in contrast to the linear compounds, at least one carbon atom in the compound in question is a tertiary or quaternary carbon atom. Cyclic aliphatic compounds or cyclic-aliphatic compounds are those compounds in which at least some of the carbon atoms present in the molecule are linked in such a way as to form one or more rings. Of course, in addition to the one or more rings, there may be further acyclic straight-chain or branched aliphatic groups and/or molecular moieties present in a cyclic-aliphatic compound.

Functional groups or molecular moieties for the purposes of the present invention are designations for groups which include or consist of heteroatoms such as oxygen and/or sulfur, for example. The functional groups may be bridging, in other words may represent, for example, an ether, ester, keto or sulfonyl group, or may be terminal, as in the case of hydroxyl groups or carboxyl groups, for example. It is also possible for bridging and terminal functional groups to be present at the same time in an aliphatic compound.

An aliphatic group, accordingly, is a group which meets the conditions stated above for the aliphatic compounds, but is only part of a molecule.

The distinction between aliphatic compounds and aliphatic groups is used for greater clarity and clearer definition, for the following reasons:

If an aliphatic radical is selected as radical X in the aforementioned cyclic tetracarboxylic dianhydrides (a), this radical according to the definition given above, with respect to component (a), is evidently an aliphatic compound. Likewise possible, however, is for compound status to be ascribed to a component (a) which consists of two anhydride groups, each arranged in a ring structure, and also of an aliphatic radical arranged between the anhydride groups. The second way of viewing the compound has the advantage that the groups necessarily present in each case, presently the two anhydride groups each arranged in a ring structure, can be named explicitly. For this reason, this form of viewing and naming has also been selected in the definition of the components (a).

An aromatic compound, as is known, is a cyclic, planar organic compound having at least one aromatic system, therefore containing at least one ring system with a fully conjugated π-system in accordance with the aromaticity criteria of Hückel. It may for example be a pure hydrocarbon compound (benzene, for example). It is also possible for certain heteroatoms to be incorporated in the ring structure (pyridine is an example). As well as the one or more aromatic ring systems, an aromatic compound may also contain further straight-chain and/or branched hydrocarbon groups and also bridging and/or terminal functional groups as part of the aromatic compound, provided they form a part of the fully conjugated π-system. For example, two phenyl rings linked by a keto group or an ether group are likewise aromatic compounds.

For the purposes of the invention, accordingly, an aromatic group is a group which meets the stipulations given above for the aromatic compounds, but is only part of a molecule. As an example, reference may be made to an aromatic group X of a component (a).

An araliphatic compound is an organic compound which comprises aromatic and aliphatic molecular moieties. A mixed aromatic-aliphatic compound of this kind must accordingly contain both an aromatic group and an aliphatic group.

An araliphatic group, accordingly, for the purposes of the invention is a group which meets the stipulations given above for the araliphatic compounds, but is only part of a molecule. By way of example, reference may be made to an araliphatic group X of a component (a).

It is preferred for the radical X of component (a) to contain not more than five, more preferably not more than three, more particularly not more than two, bridging functional groups such as ether, ester, keto or sulfonyl groups, for example.

It is likewise preferred for the radical X of component (a) to contain no terminal functional groups which may lead to ring opening of the cyclic carboxylic anhydrides. It is therefore preferred for the radical X of component (a) to contain no terminal functional groups selected from the group consisting of hydroxyl groups, carboxyl groups, and amino groups, and more preferably no terminal functional groups at all.

Especially preferred radicals X of component (a) contain not more than two bridging functional groups and no terminal functional groups.

The cyclic tetracarboxylic dianhydride is preferably pyromellitic dianhydride, cyclobutanetetracarboxylic dianhydride, benzophenonetetracarboxylic dianhydride, bicyclooctenetetracarboxylic dianhydride or diphenyl sulfone tetracarboxylic dianhydride, or else 4,4'-(4,4'-isopropylidenediphenoxy)bis(phthalic anhydride) or 4,4'-oxydiphthalic anhydride. Especially preferred is pyromellitic dianhydride.

The reaction products of the invention can be prepared using at least one polyether (b) of the general structural formula (II)

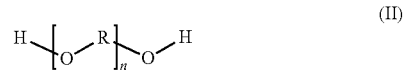

(II)

where R is a $C_3$ to $C_6$ alkyl radical. The index n should be selected in each case such that said polyether possesses a number-average molecular weight of 500 to 5000 g/mol. Preferably it possesses a number-average molecular weight of 650 to 4000 g/mol, more preferably of 1000 to 3500 g/mol, and very preferably 1500 to 3200 g/mol. The number-average molecular weight for example may be 1000 g/mol, 2000 g/mol or 3000 g/mol.

The number-average molecular weight for the purposes of the present invention, unless specifically indicated otherwise, is determined by vapor pressure osmosis. Measurement in the context of the present invention took place using a vapor pressure osmometer (model 10.00 from Knauer) on concentration series of the component under investigation in toluene at 50° C., using benzophenone as calibration substance for determining the experimental calibration constant of the measuring instrument used (according to E. Schröder, G. Müller, K.-F. Arndt, "Leitfaden der Polymercharakterisierung", Akademie-Verlag, Berlin, pp. 47-54, 1982, which used benzil as calibration substance).

As is known and as has already been elucidated earlier on above, the number-average molecular weight is always a statistical average value. The same must therefore also be true of the parameter n in formula (II). The designation polyether selected for component (b), which requires elucidation in this context, is understood as follows. Polymers, polyethers (b), for example, are always mixtures of molecules of different sizes. At least a part or all of these molecules is or are distinguished by a sequence of identical or different monomer units (as the reacted form of monomers). The polymer or molecular mixture therefore in principle comprises molecules which contain a plurality of (that is, at least two) identical or different monomer units.

Within the mixture of course, there may also be a proportion of the monomers themselves, in other words in their unreacted form. This is governed, as is known, simply by the preparation reaction—that is, polymerization of monomers—which in general does not proceed with molecular uniformity. While a particular monomer can be assigned a discrete molecular weight, therefore, a polymer is always a mixture of molecules which differ in their molecular weight. A polymer can therefore not be described by a discrete molecular weight, instead being assigned, as is known, average molecular weights in all cases, an example being the number-average molecular weight stated above.

In the polyether, all n radicals R may be the same. It is, however, also possible for different kinds of radicals R to be present. Preferably all of the radicals R are the same.

R is preferably a $C_4$ alkylene radical. More preferably it is a tetramethylene radical.

Very preferably the polyether is a linear polytetrahydrofuran which on average is diolic.

There are no peculiarities to the preparation of the reaction product. Components (a) and (b) are linked with one another via common-knowledge reactions of hydroxyl groups with anhydride groups. The reaction may take place, for example, in bulk or in solution with typical organic solvents at temperatures of, for example, 100° C. to 300° C., preferably at temperatures of 100° C. to 180° C., and especially preferably at temperatures of 100° C. to 160° C. It is of course also possible for typical catalysts such as sulfuric acid, sulfonic acids and/or tetraalkyl titanates, zinc and/or tin alkoxylates, and dialkyltin oxides such as di-n-butyltin oxide, for example, to be employed. It should of course be borne in mind that a carboxy-functional reaction product must be produced. Since component (b) is employed in excess, care should be taken to ensure that the particular desired amount of carboxyl groups remains in the resulting product. It is preferred if the carboxyl group which is formed or remains after opening of the anhydride is on average retained and not further reacted. This can be easily achieved by the skilled person by bringing about the termination of the ongoing reaction via a change in the temperature. Observing the acid number in the course of the reaction, through corresponding measurements, allows the reaction to be discontinued in a controlled way when the desired acid number has been reached—for example, by cooling to a temperature at which reaction can no longer take place. The entire ring-opening conversion reaction of the anhydride with the hydroxyl groups can be carried out in exactly this way at such low temperatures that there is no notable condensation reaction of carboxyl groups with hydroxyl groups.

In this case the components (a) and (b) are used in a molar ratio of 0.7/2.3 to 1.6/1.7, preferably of 0.8/2.2 to 1.6/1.8, and very preferably of 0.9/2.1 to 1.5/1.8. A further particularly preferred ratio range is from 0.45/1 to 0.55/1.

The reaction product is carboxy-functional. The acid number of the reaction product is from 5 to 80 mg KOH/g, preferably 10 to 70 mg KOH/g, especially preferably 12 to 60 mg KOH/g, and very preferably 15 to 55 mg KOH/g. The acid number is determined in accordance with DIN 53402 and relates of course in each case to the product per se (and not to the acid number of any solution or dispersion of the product in a solvent that is present). Where the present invention refers to an official standard, the valid version of the standard is of course that which was valid on the filing date or, if there was no valid version at that point in time, the most recent valid version.

The resulting reaction product possesses preferably a number-average molecular weight of 1500 to 15 000 g/mol, preferably of 2000 to 10 000 g/mol, and very preferably of 2200 to 7000 g/mol.

The reaction product for use in accordance with the invention is generally hydroxyl-functional, preferably on average dihydroxyl-functional. It preferably, therefore, possesses both hydroxyl functions and carboxyl functions.

Especially preferred reaction products are preparable by reaction of (a) at least one cyclic tetracarboxylic dianhydride, having an aliphatic, aromatic or araliphatic radical X for bridging the two anhydride groups, with (b) a diolic, linear polytetrahydrofuran having a number-average molecular weight of 650 to 4000 g/mol, with components (a) and (b) being used in a molar ratio of 0.45/1 to 0.55/1 and with the reaction products having an acid number of 10 to 70 mg KOH/g and also a number-average molecular weight of 1500 to 10 000 g/mol.

As and when required, all reaction products for use in accordance with the invention may be combined to produce a finely divided, aqueous dispersion, by gradual addition of N,N-dimethylethanolamine and water at 30° C. to the polymer, which has been melted beforehand, in order for this composition to be added to an aqueous coating formulation.

The sum total of the weight-percentage fractions, based on the total weight of the pigmented aqueous basecoat material, of all reaction products for inventive use is preferably 0.1 to 20 wt %, more preferably 0.5 to 15 wt %, and very preferably 1.0 to 10 wt %, or even 1.5 to 5 wt %.

Where the amount of the reaction product of the invention is below 0.1 wt %, it may be possible that there is no longer any improvement in the mechanical properties, especially adhesion and stonechip resistance (the stonechip resistance as such is not in fact a property which is of key relevance in the context of regions on which the present invention is focused, in other words the interior of a vehicle body, and yet the stonechip resistance is to provide useful information on the resistance of a coated surface to mechanical challenges of everyday service). If the amount is more than 20 wt %, there may in certain circumstances be disadvantages, such as susceptibility to moisture or condensation arising from the polar character.

In the case of a possible particularization to basecoat materials comprising preferred reaction products in a specific proportional range, the following applies: the reaction products which do not fall within the preferred group may of course still be present in the basecoat material. In that case, the specific proportional range applies only to the preferred group of reaction products. It is nevertheless preferred for the specific fractional range to apply likewise to the total fraction of reaction products, consisting of reaction products from the preferred group and reaction products which do not fall within the preferred group.

In the case, therefore, of restriction to a proportional range of 0.5 to 15 wt % and to a preferred group of reaction products, this proportional range evidently applies first of all only to the preferred group of reaction products. It would in that case be preferred, however, for there to be likewise from 0.5 to 15 wt % present of all originally encompassed reaction products, consisting of reaction products from the preferred group and reaction products which do not fall into the preferred group. If, therefore, 5 wt % of reaction products of the preferred group is used, then at most 10 wt % of the reaction products of the nonpreferred group may be used.

For the purposes of the present invention, the stated principle applies to all stated components of the basecoat material and to their proportional ranges, examples being the pigments, the polyurethane resins as binders, or else the crosslinking agents such as melamine resins.

The basecoat materials used in accordance with the invention comprise color and/or effect pigments. Color and effect pigments of this kind are known to the skilled person and are described for example in Römpp-Lexikon Lacke and Druckfarben, Georg Thieme Verlag, Stuttgart, New York, 1998, pages 176 and 451. The proportion of pigments may be situated for example in the range from 1 to 40 wt %, preferably 2 to 30 wt %, more preferably 3 to 25 wt %, based on the total weight of the pigmented aqueous basecoat material.

Basecoat materials preferred for the purposes of the present invention are those which comprise as their binders polymers curable physically, thermally, or both thermally and with actinic radiation. Binder in the context of the present invention, in accordance with relevant DIN EN ISO 4618, refers to the nonvolatile fraction of a coating composition, without pigments and fillers. Specific binders, accordingly, also include, for example, typical coatings additives, the reaction product of the invention, or typical crosslinking agents described later on below, even though the expression is used primarily below in relation to particular polymers curable physically, thermally, or both thermally and with actinic radiation, examples being particular polyurethane resins.

Besides the reaction product of the invention, the pigmented aqueous basecoat materials of the invention with particular preference comprise at least one further polymer as binder, different from the reaction product, and more particularly at least one polymer selected from the group consisting of polyurethanes, polyesters, poly(meth)acrylates and/or copolymers of the stated polymers, and especially preferably in any case, they are not necessarily exclusively, at least one polyurethane poly(meth)acrylate.

In the context of the present invention, the term "physical curing" means the formation of a film through loss of solvent from polymer solutions or polymer dispersions. Typically, no crosslinking agents are necessary for this curing.

In the context of the present invention, the term "thermal curing" means the heat-initiated crosslinking of a coating film, with either a separate crosslinking agent or else self-crosslinking binders being employed in the parent coating material. The crosslinking agent contains reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. Examples of suitable complementary reactive functional groups and autoreactive functional groups are known from German patent application DE 199 30 665 A1, page 7 line 28 to page 9 line 24.

For the purposes of the present invention, actinic radiation means electromagnetic radiation such as near infrared (NIR), UV radiation, more particularly UV radiation, and particulate radiation such as electron radiation. Curing by UV radiation is commonly initiated by radical or cationic photoinitiators. Where thermal curing and curing with actinic light are employed in unison, the term "dual cure" is also used.

In the present invention preference is given both to basecoat materials which are curable physically and to those which are curable thermally. In the case of basecoat materials which are curable thermally, of course, there is always also a proportion of physical curing. For reasons of ease of comprehension, however, such coating materials are referred to just as thermally curable.

Preferred thermally curing basecoat materials are those which comprise as binder a polyurethane resin and/or polyurethane poly(meth)acrylate, preferably a hydroxyl-containing polyurethane resin and/or polyurethane poly(meth)acrylate, and as crosslinking agent an aminoplast resin or a blocked or nonblocked polyisocyanate, preferably an aminoplast resin. Among the aminoplast resins, melamine resins are preferred.

The sum total of the weight-percentage fractions, based on the total weight of the pigmented aqueous basecoat material, of all crosslinking agents, preferably aminoplast resins and/or blocked and/or nonblocked polyisocyanates, more particularly preferably melamine resins, is preferably 1 to 20 wt %, more preferably 1.5 to 17.5 wt %, and very preferably 2 to 15 wt % or even 2.5 to 10 wt %.

The polyurethane resin and/or polyurethane poly(meth) acrylate preferably present may be ionically and/or nonionically hydrophilically stabilized. In preferred embodiments of the present invention the polyurethane resin and/or polyurethane poly(meth)acrylate is ionically hydrophilically stabilized.

Suitable saturated or unsaturated polyurethane resins and/or polyurethane poly(meth)acrylates are described, for example, in German patent application DE 199 14 896 A1, column 1, lines 29 to 49 and column 4, line 23 to column 11, line 5, German patent application DE 199 48 004 A1, page 4, line 19 to page 13, line 48, European patent application EP 0 228 003 A1, page 3, line 24 to page 5, line 40, European patent application EP 0 634 431 A1, page 3, line 38 to page 8, line 9, international patent application WO 92/15405, page 2, line 35 to page 10, line 32, or German patent application DE 44 37 535 A1.

The polyurethane resins and/or polyurethane poly(meth)acrylates preferably present possess for example, a hydroxyl number of 0 to 250 mg KOH/g, but more particularly from 20 to 150 mg KOH/g. The acid number is preferably 5 to 200 mg KOH/g, more particularly 10 to 40 mg KOH/g. The hydroxyl number is determined in the context of the present invention in accordance with DIN 53240.

The amount of further polymers as binders, more particularly polyurethane resins and/or polyurethane poly(meth)acrylates, is preferably between 5 and 80 wt %, more preferably between 8 and 70 wt %, and very preferably between 10 and 60 wt %, based in each case on the film-forming solids of the basecoat material.

By film-forming solids, corresponding ultimately to the binder fraction, is meant the nonvolatile weight fraction of the basecoat material, without pigments and, where appropriate, fillers. The film-forming solids can be determined as follows: A sample of the pigmented aqueous basecoat material (approximately 1 g) is admixed with 50 to 100 times the amount of tetrahydrofuran and then stirred for around 10 minutes. The insoluble pigments and any fillers are then removed by filtration and the residue is rinsed with a little THF, the THF being removed from the resulting filtrate on a rotary evaporator. The residue of the filtrate is dried at 120° C. for two hours and the resulting film-forming solids are obtained by weighing.

The sum total of the weight-percentage fractions, based on the total weight of the pigmented aqueous basecoat material, of all further polymers as binders, more particularly polyurethane resins and/or polyurethane poly(meth)acrylates, is preferably 2 to 40 wt %, more preferably 2.5 to 30 wt %, and very preferably 3 to 20 wt %.

There is preferably also a thickener present. Suitable thickeners are inorganic thickeners from the group of the phyllosilicates. As well as the inorganic thickeners, however, it is also possible to use one or more organic thickeners. These are preferably selected from the group consisting of (meth)acrylic acid-(meth)acrylate copolymer thickeners, for example the commercial product Rheovis AS S130 (BASF), and of polyurethane thickeners, for example the commercial product Rheovis PU 1250 (BASF). The thickeners used are different from the binders used.

Furthermore, the pigmented aqueous basecoat material may further comprise at least one adjuvant. Examples of such adjuvants are salts which can be decomposed thermally without residue or substantially without residue, resins as binders that are curable physically, thermally and/or with actinic radiation and are different from the above-described polymers, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Also present may be thickeners such as inorganic thickeners from the group of the phyllosilicates, or organic thickeners such as (meth)acrylic acid-(meth)acrylate copolymer thickeners or else polyurethane thickeners, which are different from the binders used.

Suitable adjuvants of the aforementioned kind are known, for example, from
  German patent application DE 199 48 004 A1, page 14, line 4, to page 17, line 5,
  German patent DE 100 43 405 C1, column 5, paragraphs [0031] to [0033].
They are used in the customary and known amounts.

The solids content of the basecoat materials of the invention may vary according to the requirements of the case in hand. The solids content is guided primarily by the viscosity required for application, more particularly for spray application, and so may be adjusted by the skilled person on the basis of his or her general art knowledge, optionally with assistance from a few exploratory tests.

The solids content of the basecoat materials is preferably 5 to 70 wt %, more preferably 8 to 60 wt %, and very preferably 12 to 55 wt %.

By solids content (nonvolatile fraction) is meant that weight fraction which remains as a residue on evaporation under specified conditions. In the present application, the solids content, unless explicitly indicated otherwise, is determined in accordance with DIN EN ISO 3251. This is done by evaporating the basecoat material at 130° C. for 60 minutes.

Unless indicated otherwise, this test method is likewise employed in order to determine, for example, the fraction of various components of the basecoat material as a proportion of the total weight of the basecoat material. Thus, for example, the solids of a dispersion of a polyurethane resin which is to be added to the basecoat material may be determined correspondingly in order to ascertain the fraction of this polyurethane resin as a proportion of the overall composition.

The basecoat material of the invention is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the coating composition in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn, the water fraction is 40 to 90 wt %, more particularly 50 to 80 wt %, very preferably 60 to 75 wt %, based in each case on the total amount of the solvents present.

The basecoat materials employed in accordance with the invention may be produced using the mixing assemblies and mixing techniques that are customary and known for producing basecoat materials.

The Method of the Invention and the Multicoat Paint System of the Invention

In the method of the invention for producing a paint system on a substrate, the basecoat material described above was used.

The method therefore comprises the producing of a cured basecoat film on the substrate by application of the above-described pigmented aqueous basecoat material to the substrate and subsequent curing of the basecoat material,
  where
  the cured basecoat film represents at least partially the uppermost coat of the paint system produced.

The pigmented aqueous basecoat material used in accordance with the invention is commonly applied to metallic or plastics substrates that have been pretreated with surfacer or primer-surfacer. Said basecoat material may optionally also be applied directly to plastics substrate.

Where a metallic substrate is to be coated, it is preferably further coated with an electrocoat system before the surfacer or primer-surfacer is applied. Of course, the basecoat material for inventive use may be applied directly to the cured electrocoat film. Another possibility is for a first basecoat material to be applied to the electrocoat film, for this basecoat to be recoated with a basecoat material for inventive use, and for the two basecoat films then to be jointly cured as described later on below.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

Application of the pigmented aqueous basecoat material of the invention to metallic substrates already coated, as described above, with cured electrocoat systems and/or surfacers may take place in the film thicknesses customary within the automobile industry, in the range, for example, of 5 to 100 micrometers, preferably 5 to 60 micrometers (dry film thickness). This is done using spray application methods, for example compressed air spraying, airless spraying, high-speed rotation, electrostatic spray application (ESTA), alone or in conjunction with hot spray application, for example hot air spraying.

Following the application of the pigmented aqueous basecoat material, it can be interim-dried by known methods. For example, (1-component) basecoat materials, which are preferred, can be flashed at room temperature for 1 to 60 minutes and subsequently interim-dried, preferably at optionally slightly elevated temperatures of 30 to 90° C. Flashing and interim-drying in the context of the present invention mean the evaporation of organic solvents and/or water, as a result of which the paint becomes drier but has not yet cured or not yet formed a fully crosslinked coating film.

Subsequently, at least one further coating composition, as for example a commercial clearcoat material, may be applied, by likewise common methods, to a part of the basecoat film, with the film thicknesses again being within the customary ranges, of 5 to 100 micrometers, for example. It is important, however, for the purposes of the present invention that the basecoat film represents at least partially the uppermost coat of the paint system or multicoat paint system produced.

After the optional clearcoat material has been applied, it can be flashed at room temperature for 1 to 60 minutes, for example, and optionally dried. The clearcoat material is then cured together with the applied pigmented basecoat material. In the course of these procedures, crosslinking reactions occur, for example, to produce on a substrate a multicoat color and/or effect paint system of the invention. Curing may take place at temperatures from 70 to 200° C.

A particular advantage in the context of the present invention, however, is that in spite of the fact that at least part of the overall system of substrate and coating systems has a constitution such that the cured basecoat film represents the uppermost coat of the paint system produced, it can be cured at relatively low temperatures of not more than 120° C., and nevertheless produces an overall system which meets the specifications in terms of hardness and adhesion.

Accordingly, in the context of the present invention, the applied basecoat material is cured preferably at 70 to 120° C., more preferably at 75 to 110° C., very preferably at 75 to 100° C.

The applied basecoat material in this case is either cured alone (if, for example, a surfacer has been applied and separately cured beforehand, and no other coating composition is partially applied) or cured together with other coating compositions (if, for example, a clearcoat material is applied proportionally to the as yet uncured basecoat film, or if a different coating layer, not separately cured, has been produced beneath the basecoat material).

The coating of plastics substrates takes place basically in the same way as for metallic substrates, it being necessary of course to ensure that the curing temperatures are low enough to preserve the integrity of the substrate. Advantageous in this context correspondingly is the method of the invention.

One advantage of the method of the invention in this context is that even a substrate which consists, for example, proportionally of plastic and proportionally of metal can be coated and cured in one operation. The reason is that the low curing temperatures mean that the plastics substrate does not suffer deformation, instead retaining its structural integrity.

Another subject of the present invention, of course, is a painted substrate resulting on application of the method, and also a paint system produced by the method.

A further aspect of the present invention is the use of the pigmented aqueous basecoat material, as described, for improving the mechanical stability, especially adhesion, of paint systems produced using the basecoat material and subjected to low-temperature curing.

Low-temperature curing is a familiar term to the skilled person. It refers preferably to curing at temperatures of less than 120° C., preferably less than 100° C.

The invention is elucidated below with examples.

EXAMPLES

Determination of Number-Average Molecular Weight

The number-average molecular weight is determined by vapor pressure osmosis. Measurement took place using a vapor pressure osmometer (model 10.00, from Knauer) on concentration series of the component under investigation in toluene at 50° C., with benzophenone as calibration substance for determining the experimental calibration constant of the instrument used (according to E. Schröder, G. Müller, K.-F. Arndt, "Leitfaden der Polymercharakterisierung", Akademie-Verlag, Berlin, pp. 47-54, 1982, which differs in using benzil as calibration substance).

Preparation of a Reaction Product ER for Inventive Use

In a 4 l stainless steel reactor equipped with anchor stirrer, thermometer, condenser, and thermometer for overhead temperature measurement, 128.1 g of pyromellitic dianhydride (CAS No. 89-32-7, Lonza) (0.5873 mol) and 2349.9 g of linear PolyTHF2000 (BASF SE) with an OH number (OH number determined according to DIN 53240) of 56.1 mg KOH/g (1.1750 mol), and 50.0 g of cyclohexane in the presence of 2.0 g of di-n-butyltin oxide (Axion® CS 2455, Chemtura) were heated to 130° C. product temperature and maintained at that temperature.

After about three hours, the reaction mixture was clear and an acid number was determined for the first time. The mixture was held at 130° C. for three hours more until the acid number was 26.3 mg KOH/g (theoretical: 26.6 mg KOH/g). The cyclohexane was removed by distillation at 130° C. under reduced pressure with stirring. Gas chromatography found a cyclohexane content of less than 0.15 wt %.

After three days, the polymer, which was initially liquid at room temperature, begins to crystallize. The solid polymer can be melted easily at a temperature of 80° C. and remains liquid for at least two hours at room temperature as well, and so can easily be added in this state to a coating formulation.

Solids content (130° C., 60 min, 1 g): 99.9%

Acid number: 26.3 mg KOH/g

Number-average molecular weight (vapor pressure osmosis): 4100 g/mol

Viscosity (resin: butyl glycol (BASF SE)=2:1): 3100 mPa·s, (measured at 23° C. with a rotary viscometer from Brookfield, CAP 2000+ model, spindle 3, shear rate: 2500 s$^{-1}$)

Production of Aqueous Basecoat Materials and Paint Systems, and Investigation of Said Systems With regard to the formulation constituents and amounts thereof that are indicated in the tables below, the following should be borne in mind: Where reference is made to a commercial product or to a preparation protocol described elsewhere, the reference is specifically to that commercial product or specifically to the product prepared within the referenced protocol, irrespective of the principal designation selected for the constituent in each case.

If, therefore, a formulation constituent possesses the principal designation "melamine-formaldehyde resin" and if a commercial product is specified for it, then the melamine-formaldehyde resin is used in the form of exactly that commercial product. Any further constituents present in the commercial product, such as solvents, must therefore be taken into account if conclusions are to be drawn about the amount of the active substance (the melamine-formaldehyde resin).

Consequently, if a preparation protocol is referenced for a formulation constituent, and if this preparation results, for example, in a polymer dispersion having a defined solids content, then exactly that dispersion is used. It is immaterial whether the principal designation selected is that of "polymer dispersion" or only of the active substance, such as "polymer", "polyester" or "polyurethane-modified polyacrylate" by way of example. This must be taken into account if conclusions are to be drawn about the amount of the active substance (the polymer).

All proportions indicated in the tables are parts by weight.

Production of a Black Metallic Waterborne Basecoat Material V1

The components listed in table A under "Aqueous phase" were combined with stirring in the order stated to form an aqueous mixture. In the next step, an organic mixture was prepared from the components listed under "Organic phase". The organic mixture was added to the aqueous mixture. The resulting mixture was then stirred for 10 minutes and adjusted using deionized water and dimethylethanolamine to a pH of 8 and to a spray viscosity of 100 mPas under a shearing load of 1000 $s^{-1}$ as measured with a rotary viscometer (Rheomat RM 180 instrument from Mettler-Toledo) at 23° C.

TABLE A

Waterborne basecoat material V1

| Component | Parts by weight |
| --- | --- |
| Aqueous phase | |
| 3% Na Mg phyllosilicates solution | 12.88 |
| Deionized water | 7.58 |
| Butyl glycol (BASF) | 1.46 |
| Isopropanol (BASF) | 1.62 |
| n-Propanol (BASF) | 0.52 |
| Butyl diglycol (BASF) | 0.97 |
| Butoxypropanol (BASF) | 1.35 |
| 2-Ethylhexanol (BASF) | 2.7 |
| Isopar L (Exxon Mobil) | 0.52 |
| Byk ®-347 (Altana-Byk Chemie) | 0.44 |
| Nacure 2500 (King Industries) | 0.4 |
| Daotan TW6464 (Cytec) | 1.21 |
| Polyurethane dispersion - prepared as in WO 92/15405 (page 14, line 13 to page 15, line 13) | 20.21 |
| Polyurethane-modified polyacrylate; prepared as per page 7, line 55 to page 8, line 23 of DE 4437535 A1 | 2.7 |
| 50 wt % solution of Rheovis ® PU 1250 (BASF) rheological agent | 0.18 |
| 80% solution in butyl glycol of a polyester prepared as per page 28, lines 13 to 33 of WO 2014/033135 A2 | 2.16 |
| TMDD (BASF) | 1.36 |
| Melamine-formaldehyde resin (Cymel ® 3020 from Cytec) | 3.73 |

TABLE A-continued

Waterborne basecoat material V1

| Component | Parts by weight |
| --- | --- |
| 10% dimethylethanolamine in water | 0.88 |
| Polyurethane-based graft copolymer; prepared as in example A (page 72, line 8 to page 75, line 11) of WO2015/091204 A1 | 15.86 |
| Carbon black paste | 9.74 |
| Blue paste | 2.37 |
| Barium sulfate paste | 3.13 |
| Interference pigment suspension | |
| Mearlin Ext. super violet | 0.4 |
| Iriodin SQB rutile pearl blue | 0.82 |
| Mixing varnish, prepared as in EP 1534792 B1, column 11, lines 1-17 | 3.95 |
| Organic phase | |
| Mixture of two commercial aluminum pigments, available from Altana-Eckart | 0.26 |
| Butyl glycol | 0.34 |
| Polyester; prepared as per example D, column 16, lines 37-59 of DE-A-4009858 | 0.26 |

Preparation of Carbon Black Paste

The carbon black paste was prepared from 25 parts by weight of an acrylated polyurethane dispersion prepared in accordance with binder dispersion A of international patent application WO 91/15528, 10 parts by weight of carbon black, 0.1 part by weight of methyl isobutyl ketone, 1.45 parts by weight of dimethylethanolamine (10% in DI water), 2 parts by weight of a commercial polyether (Pluriol® P900 from BASF SE), and 61.45 parts by weight of deionized water.

Preparation of Blue Paste

The blue paste was prepared from 69.8 parts by weight of an acrylated polyurethane dispersion prepared in accordance with binder dispersion A of international patent application WO 91/15528, 12.5 parts by weight of Paliogen® Blue L 6482, 1.5 parts by weight of dimethylethanolamine (10% in DI water), 1.2 parts by weight of a commercial polyether (Pluriol® P900 from BASF SE), and 15 parts by weight of deionized water.

Production of Inventive Black Metallic Waterborne Basecoat Materials E1-E4

Waterborne Basecoat Material E1

The components listed in table B under "Aqueous phase" were combined with stirring in the order stated to form an aqueous mixture. In the next step, an organic mixture was prepared from the components listed under "Organic phase". The organic mixture was added to the aqueous mixture. The resulting mixture was then stirred for 10 minutes and adjusted using deionized water and dimethylethanolamine to a pH of 8 and to a spray viscosity of 100 mPas under a shearing load of 1000 $s^{-1}$ as measured with a rotary viscometer (Rheomat RM 180 instrument from Mettler-Toledo) at 23° C.

TABLE B

Waterborne basecoat material E1

| Component | Parts by weight |
| --- | --- |
| Aqueous phase | |
| 3% Na Mg phyllosilicates solution | 19.63 |
| Deionized water | 6.56 |
| Butyl glycol (BASF) | 4.72 |

TABLE B-continued

Waterborne basecoat material E1

| Component | Parts by weight |
|---|---|
| Adeka NOL UH-756VF (Adeka) | 0.39 |
| Polyurethane-modified polyacrylate; prepared as per page 7, line 55 to page 8, line 23 of DE 4437535 A1 | 3.0 |
| Reaction product ER | 3.15 |
| TMDD (BASF) | 1.83 |
| Melamine-formaldehyde resin (Luwipal ® 052 from BASF) | 4.09 |
| 10% dimethylethanolamine in water | 0.65 |
| Polyurethane-based graft copolymer; prepared as in example A (page 72, line 8 to page 75, line 11) of WO2015/091204 A1 | 32.33 |
| Carbon black paste | 12.74 |
| Blue paste | 3.10 |
| Interference pigment suspension | |
| Mearlin Ext. super violet | 0.52 |
| Iriodin SQB rutile pearl blue | 1.07 |
| Mixing varnish, prepared as in EP 1534792 B1, column 11, lines 1-17 | 4.84 |
| Organic phase | |
| Mixture of two commercial aluminum pigments, available from Altana-Eckart | 0.34 |
| Butyl glycol | 0.39 |
| Polyurethane-based graft copolymer; prepared as in example A (page 72, line 8 to page 75, line 11) of WO2015/091204 A1 | 0.65 |

Waterborne basecoat material E2 was produced as per table B, but using 6.82 rather than 4.09 parts by weight of melamine-formaldehyde resin (Luwipal® 052 from BASF) and using 25.95 rather than 32.33 parts by weight of polyurethane-based graft copolymer prepared as in example A (page 72, line 8 to page 75, line 11) of WO2015/091204 A1.

Waterborne basecoat material E3 was produced as per table B, but using 5.25 rather than 3.15 parts by weight of the reaction product ER and using 25.95 rather than 32.33 parts by weight of polyurethane-based graft copolymer prepared as in example A (page 72, line 8 to page 75, line 11) of WO2015/091204 A1.

The waterborne basecoat material E4 was prepared as in table B, but with the addition of 0.67 part by weight of Nacure 2500 (King Industries).

Comparison Between Waterborne Basecoat Materials V1 and E1-E4

Stonechip Resistance

The stonechip resistance was determined by producing the multicoat paint systems according to the following general protocol:

The substrate used was a steel panel with dimensions of 10×20 cm, coated with a CEC (cathodic electrocoat). Applied first of all to this panel, pneumatically, was the respective basecoat material (see table 1) with a target film thickness (dry film thickness) of 20 micrometers. After the basecoat had been flashed off at room temperature for 1 minute, it was interim-dried in a forced air oven at 70° C. for 10 minutes. Applied over the interim-dried waterborne basecoat film was a customary two-component clearcoat material (Progloss® 372 from BASF Coatings GmbH) with a target film thickness (dry film thickness) of 40 micrometers. The resulting clearcoat film was flashed off at room temperature for 20 minutes. Thereafter the waterborne basecoat film and the clearcoat film were cured in a forced air oven for 30 minutes at various temperatures (see table 1).

In a further experiment, the coating systems obtained after room-temperature flash-off and interim-drying of the basecoat material in a forced air oven at 70° C. for minutes were cured directly—without further coating with a clearcoat—in a forced air oven for 30 minutes at various temperatures (see table 1).

The resulting multicoat paint systems were investigated for their stonechip resistance. For this purpose, the stonechip test was carried out according to DIN 55966-1. The results of the stonechip test were assessed according to DIN EN ISO 20567-1. Lower values represent better stonechip resistance.

The resulting multicoat paint systems were also investigated for cross-cut adhesion. For this purpose the cross-cut was carried out according to DIN EN ISO 2409:2013-6. The results of the cross-cut test were assessed in accordance with DIN EN ISO 2409:2013-6. Low result values denote improved adhesion.

In addition, the steel panels thus treated were subjected to a steam jet test as per DIN 55662:2009-12 (Method A) and then assessed in accordance with the aforesaid DIN.

The results are found in table 1. The indication of the waterborne basecoat material (WBM) indicates in each case which WBM was used in the respective multicoat paint system. CCC stands for condensation conditioning chamber and indicates the exposure of the test panels in accordance with DIN EN ISO 6270-2 prior to the stonechip and/or steam jet tests.

TABLE 1

| Waterborne basecoat material used | Clearcoat material | Baking temperature | Stonechip result @ RT | Stonechip result @ −20° C. | Stonechip result after CCC | Cross-cut result | Steam jet result | Steam jet result after CCC |
|---|---|---|---|---|---|---|---|---|
| V1 | Yes | 110° C. | 1.5 | 1.5 | 1.5 | 0 | 0 | 0 |
| V1 | No | 110° C. | | | | 1 | 1a | |
| E1 | Yes | 110° C. | 1.5 | 1.5 | 1.5 | 0 | 0 | 0 |
| E1 | No | 110° C. | | | | 0 | 0 | |
| E2 | Yes | 110° C. | 1.5 | 1.5 | 1.5 | 0 | 0 | 0 |
| E2 | No | 110° C. | | | | 0 | 0 | |
| E3 | Yes | 110° C. | 1.5 | 1.5 | 1.5 | 0 | 0 | 0 |
| E3 | No | 110° C. | | | | 0 | 0 | |
| E4 | Yes | 110° C. | 1.5 | 1.5 | 1.5 | 0 | 0 | 0 |
| E4 | No | 110° C. | | | | 0 | 0 | |
| V1 | Yes | 100° C. | 1.5 | 1.5 | 1.5 | 0 | 0 | 0 |
| V1 | No | 100° C. | | | | TE | 5a | |
| E1 | Yes | 100° C. | 1.5 | 1.5 | 1.5 | 0 | 0 | 0 |
| E1 | No | 100° C. | | | | 0 | 0 | |
| E2 | Yes | 100° C. | 1.5 | 1.5 | 1.5 | 0 | 0 | 0 |
| E2 | No | 100° C. | | | | 0 | 0 | |

TABLE 1-continued

| Waterborne basecoat material used | Clearcoat material | Baking temperature | Stonechip result @ RT | Stonechip result @ −20° C. | Stonechip result after CCC | Cross-cut result | Steam jet result | Steam jet result after CCC |
|---|---|---|---|---|---|---|---|---|
| E3 | Yes | 100° C. | 1.5 | 1.5 | 1.5 | 0 | 0 | 0 |
| E3 | No | 100° C. | | | | 0 | 0 | |
| E4 | Yes | 100° C. | 1.5 | 1.5 | 1.5 | 0 | 0 | 0 |
| E4 | No | 100° C. | | | | 0 | 0 | |
| E1 | Yes | 90° C. | 1.5 | 1.5 | 1.5 | 0 | 0 | 0 |
| E1 | No | 90° C. | | | | 0 | 0 | |
| E4 | Yes | 90° C. | 1.0 | 1.5 | 1.5 | 0 | 0 | 0 |
| E4 | No | 90° C. | | | | 0 | 0 | |
| E1 | Yes | 80° C. | 1.5 | 1.5 | 1.5 | 0 | 0 | 0 |
| E1 | No | 80° C. | | | | 0 | 0 | |
| E4 | Yes | 80° C. | 1.0 | 1.5 | 1.5 | 0 | 0 | 0 |
| E4 | No | 80° C. | | | | 0 | 0 | |

Overall it emerges that the WBMs of the invention exhibit significantly better adhesion properties, especially at low curing temperatures. Waterborne basecoat materials E1 and E4 were selected as representative examples, and were cured at baking temperatures extremely low for one-component systems. This showed that even at baking temperatures of only 80° C., systems compliant with specifications are achievable.

Moreover, in the comparison of all of the inventive waterborne basecoat materials with the comparative system, it is evident that the systems of the invention exhibit very good results in the clearcoat-free systems, at a baking temperature again very low for 1K systems, of 100° C., whereas the comparative waterborne basecoat material already no longer shows acceptable results for cross-cut and steam jet.

Production of a Red Metallic Waterborne Basecoat Material V2

The components listed in table C under "Aqueous phase" were combined with stirring in the order stated to form an aqueous mixture. In the next step, an organic mixture was prepared from the components listed under "Organic phase". The organic mixture was added to the aqueous mixture. The resulting mixture is then stirred for 10 minutes and adjusted using deionized water and dimethylethanolamine to a pH of 8 and to a spray viscosity of 100 mPas under a shearing load of 1000 s$^{-1}$ as measured with a rotary viscometer (Rheomat RM 180 instrument from Mettler-Toledo) at 23° C.

TABLE C

Waterborne basecoat material V2

| Component | Parts by weight |
|---|---|
| Aqueous phase | |
| 3% Na Mg phyllosilicates solution | 16.1 |
| Deionized water | 19.4 |
| Butyl glycol (BASF) | 1.5 |
| Dipropylene glycol methyl ether (BASF) | 3.1 |
| Isopar L (Exxon Mobil) | 3.76 |
| SolventNaphtha 160/180 (Shell) | 0.85 |
| Pluriol P900 (BASF) | 0.85 |
| Byk ®-347 (Altana-Byk Chemie) | 0.38 |
| Agitan 281 (Münzing Chemie) | 0.09 |
| TMDD (BASF) | 2.45 |
| Polyurethane-modified polyacrylate; prepared as per page 7, line 55 to page 8, line 23 of DE 4437535 A1 | 2.35 |
| 50 wt % solution of Rheovis ® PU 1250 (BASF) rheological agent | 0.43 |
| Rheovis AS 1130 (BASF); rheological agent | 0.31 |

TABLE C-continued

Waterborne basecoat material V2

| Component | Parts by weight |
|---|---|
| Polyester; prepared as per example D, column 16, lines 37-59 of DE-A-4009858 | 1.8 |
| Melamine-formaldehyde resin (Cymel ® 327 from Cytec) | 2.85 |
| Melamine-formaldehyde resin (Luwipal ® 052 from BASF) | 3.5 |
| 10% dimethylethanolamine in water | 0.4 |
| Polyurethane acrylate; prepared as per page 19, line 44 - page 20, line 7 of DE-A-1998004 | 17.0 |
| Red paste | 17.02 |
| Carbon black paste | 0.21 |
| Organic phase | |
| Paliocrom Orange L2804 (Eckart) | 1.81 |
| Butyl glycol | 2.64 |
| Polyester; prepared as per example D, column 16, lines 37-59 of DE-A-4009858 | 1.2 |

Preparation of Red Paste

The red paste was prepared from 45.0 parts by weight of an acrylated polyurethane dispersion prepared in accordance with binder dispersion A of international patent application WO 91/15528, 21.0 parts by weight of Paliogen® Red L 3885, 0.7 part by weight of dimethylethanolamine, 2.5 parts by weight of 1,2-propylene glycol, and 30.8 parts by weight of deionized water.

Production of Inventive Red Metallic Waterborne Basecoat Materials E5 and E6

Waterborne Basecoat Material E5

The components listed in table D under "Aqueous phase" were combined with stirring in the order stated to form an aqueous mixture. In the next step, an organic mixture was prepared from the components listed under "Organic phase".

The organic mixture was added to the aqueous mixture. The resulting mixture was then stirred for 10 minutes and adjusted using deionized water and dimethylethanolamine to a pH of 8 and to a spray viscosity of 100 mPas under a shearing load of 1000 s$^{-1}$ as measured with a rotary viscometer (Rheomat RM 180 instrument from Mettler-Toledo) at 23° C.

TABLE D

Waterborne basecoat material E5

| Component | Parts by weight |
|---|---|
| Aqueous phase | |
| 3% Na Mg phyllosilicates solution | 5.07 |
| Deionized water | 11.07 |
| Isopropanol (BASF) | 5.41 |
| Adeka NOL UH-756VF (Adeka) | 0.17 |
| Polyurethane-modified polyacrylate; prepared as per page 7, line 55 to page 8, line 23 of DE 4437535 A1 | 3.04 |
| Reaction product ER | 3.11 |
| TMDD (BASF) | 1.52 |
| Melamine-formaldehyde resin (Luwipal ® 052 from BASF) | 4.03 |
| 10% dimethylethanolamine in water | 1.6 |
| Daotan TW6464 (Cytec) | 2.29 |
| Polyurethane-based graft copolymer; prepared as in example A (page 72, line 8 to page 75, line 11) of WO2015/091204 A1 | 25.57 |
| Byk ®-347 (Altana-Byk) | 0.63 |
| Pluriol P900 (BASF) | 0.38 |
| Tinuvin 384-2 (BASF) | 0.76 |
| Tinuvin 123 (BASF) | 0.38 |
| Tris(2-butoxyethyl) phosphate (Rhodia) | 2.53 |
| Texanol (Eastman) | 2.53 |
| Red paste | 21.66 |
| Carbon black paste | 0.53 |
| Organic phase | |
| Paliocrom Orange L2804 (Eckart) | 3.38 |
| Butyl glycol | 1.86 |
| Mixing varnish, prepared as in EP 1534792 B1, column 11, lines 1-17 | 2.48 |

Waterborne basecoat material E6 was produced as per table D, but using 5.18 rather than 3.11 parts by weight of the reaction product ER and using 19.20 rather than 25.57 parts by weight of polyurethane-based graft copolymer prepared as in example A (page 72, line 8 to page 75, line 11) of WO2015/091204 A1.

Comparison Between Waterborne Basecoat Materials V2 and E5-E6

Coating materials V2, E5, and E6 were investigated for performance in the same way as for the comparison between waterborne basecoat materials V1 and E1-E4. The results obtained are set out in table 2.

TABLE 2

| Waterborne basecoat material used | Clearcoat material | Baking temperature | Stonechip result @ RT | Stonechip result @ −20° C. | Stonechip result after CCC | Cross-cut result | Steam jet result | Steam jet result after CCC |
|---|---|---|---|---|---|---|---|---|
| V2 | Yes | 100° C. | 2 | 2 | 2 | 0 | 0 | 0 |
| V2 | No | 100° C. | | | | 0 | 0 | |
| E5 | Yes | 100° C. | 1.5 | 1.5 | 1.5 | 0 | 1a | 0 |
| E5 | No | 100° C. | | | | 0 | 0 | |
| E6 | Yes | 100° C. | 1.5 | 1.5 | 1.5 | 0 | 1a | 0 |
| E6 | No | 100° C. | | | | 0 | 0 | |
| V2 | Yes | 90° C. | 2 | 2 | 2.5 | 0 | 1a | 1a |
| V2 | No | 90° C. | | | | 0 | 0 | |
| E5 | Yes | 90° C. | 1.5 | 1.5 | 1.5 | 0 | 1a | 0 |
| E5 | No | 90° C. | | | | 0 | 0 | |
| E6 | Yes | 90° C. | 1.5 | 1.5 | 1.5 | 0 | 1a | 0 |
| E6 | No | 90° C. | | | | 0 | 0 | |
| V2 | Yes | 80° C. | 3 | 3 | 3 | 0 | 1a | 1a |
| V2 | No | 80° C. | | | | 0 | 5a | |
| E5 | Yes | 80° C. | 1 | 1 | 1.5 | 0 | 1a | 0 |
| E5 | No | 80° C. | | | | 0 | 0 | |
| E6 | Yes | 80° C. | 1 | 1 | 1.5 | 0 | 1a | 0 |
| E6 | No | 80° C. | | | | 0 | 0 | |

Again it is found that under the selected conditions—meaning, in particular, low curing temperatures for 1K systems—the WBMs of the invention exhibit significantly better adhesion properties. Whereas the comparative system exhibits weaknesses in terms of stonechip robustness at low temperatures, even with a clearcoat arranged over it, and is also extremely susceptible in steam jet exposure at one curing temperature, the systems of the invention display very good properties.

Furthermore, waterborne basecoat materials V2 and E5 and E6 were investigated for their adhesion properties on different substrates.

Comparison Between Waterborne Basecoat Materials V2 and E5 to E6 on Surfacer

Using coating materials V2, E5, and E6, paint systems were produced in analogy to the preparation protocol described above for waterborne basecoat materials V1 and E1-E4. However, different substrates were used, produced as follows:

A steel panel with dimensions of 10×20 cm, coated with a standard CEC, was coated with a standard surfacer from Hemmelrath. Following interim-drying of the aqueous surfacer over a period of 10 minutes at 80° C., the surfacer was baked at a temperature of 190° C. over a period of 30 minutes.

In the completed paint system, then, the respective basecoat was arranged not directly on the CEC, but instead on the surfacer coat.

The results obtained are set out in table 3.

TABLE 3

| Waterborne basecoat material used | Clearcoat material | Baking temperature | Stonechip result @ RT | Stonechip result @ −20° C. | Stonechip result after CCC | Cross-cut result | Steam jet result | Steam jet result after CCC |
|---|---|---|---|---|---|---|---|---|
| V2 | Yes | 100° C. | 1.5 | 1.5 | 2.5 | 0 | 0 | 0 |
| V2 | No | 100° C. | | | | 0 | 0 | |
| E5 | Yes | 100° C. | 1.5 | 1.5 | 1.5 | 0 | 0 | 0 |
| E5 | No | 100° C. | | | | 0 | 0 | |
| E6 | Yes | 100° C. | 1.5 | 1.5 | 1.5 | 0 | 0 | 0 |
| E6 | No | 100° C. | | | | 0 | 0 | |
| V2 | Yes | 90° C. | 1.5 | 1.5 | 2.0 | 0 | 0 | 1a |
| V2 | No | 90° C. | | | | 0 | 0 | |
| E5 | Yes | 90° C. | 1.5 | 1.5 | 1.5 | 0 | 0 | 0 |
| E5 | No | 90° C. | | | | 0 | 0 | |
| E6 | Yes | 90° C. | 1.5 | 1.5 | 1.5 | 0 | 0 | 0 |
| E6 | No | 90° C. | | | | 0 | 0 | |
| V2 | Yes | 80° C. | 2.0 | 2.5 | 3.0 | 0 | 0 | 0 |
| V2 | No | 80° C. | | | | 0 | 5a | |
| E5 | Yes | 80° C. | 1.5 | 1.5 | 1.5 | 0 | 0 | 0 |
| E5 | No | 80° C. | | | | 0 | 4a | |
| E6 | Yes | 80° C. | 1.5 | 1.5 | 1.5 | 0 | 0 | 0 |
| E6 | No | 80° C. | | | | 0 | 2b | |

Comparison Between WBMs V2 and E5 to E6 on Plastics Substrates

Using coating materials V2, E5, and E6, paint systems were produced in analogy to the preparation protocol described above for waterborne basecoat materials V1 and E1-E4. However, plastics substrates were used (Hifax® TRC 221X from Lyondell Basell). In the completed paint system, then, the respective basecoat material was arranged not directly on the CEC arranged on a metallic substrate, but instead on the plastics substrate. Table 4 shows the results.

TABLE 4

| Waterborne basecoat material used | Clearcoat material | Baking temperature | Stonechip result @ RT | Cross-cut result | Steam jet result |
|---|---|---|---|---|---|
| V2 | Yes | 100° C. | 1.5 | 0 | 0 |
| V2 | No | 100° C. | 2 | 0 | 0 |
| E5 | Yes | 100° C. | 1.5 | 0 | 0 |
| E5 | No | 100° C. | 1.5 | 0 | 1a |
| E6 | Yes | 100° C. | 1.5 | 1 | 1a |
| E6 | No | 100° C. | 1.5 | 1 | 1a |
| V2 | Yes | 90° C. | 1.5 | 0 | 0 |
| V2 | No | 90° C. | 2 | 0 | 2a |
| E5 | Yes | 90° C. | 1.5 | 0 | 0 |
| E5 | No | 90° C. | 1.5 | 1 | 2a |
| E6 | Yes | 90° C. | 1.5 | 1 | 0 |
| E6 | No | 90° C. | 1.5 | 1 | 2b |
| V2 | Yes | 80° C. | 1.5 | 0 | 0 |
| V2 | No | 80° C. | 2 | 0 | 5a |
| E5 | Yes | 80° C. | 1.5 | 0 | 0 |
| E5 | No | 80° C. | 1.5 | 2 | 2a |
| E6 | Yes | 80° C. | 1.5 | 0 | 0 |
| E6 | No | 80° C. | 1.5 | 2 | 1a |

The results show that even on alternative substrates, the effect of the significantly improved adhesion properties is confirmed.

What is claimed is:

1. A method for producing a coating system on a substrate, comprising
    producing a cured basecoat film on the substrate by applying a pigmented aqueous basecoat material to the substrate and subsequently curing the basecoat material,
    wherein
    the pigmented aqueous basecoat material comprises about 0.1 wt % to about 10 wt % of a carboxy-functional polyether-based reaction product which is prepared by reaction of
    (a) at least one cyclic tetracarboxylic dianhydride having an aliphatic, aromatic or araliphatic radical X which bridges the two anhydride groups, with
(b) at least one polyether of a general structural formula (II)

in which
R is a $C_3$ to $C_6$ alkylene radical and n is selected such that the polyether (b) possesses a number-average molecular weight of 500 to 5000 g/mol, wherein carboxyl groups formed after ring opening of the at least one cyclic tetracarboxylic dianhydride are substantially retained and not further reacted;
wherein components (a) and (b) are used in the reaction in a molar ratio of 0.7/2.3 to 1.6/1.7 and a resulting reaction product possesses an acid number of 5 to 80 mg KOH/g,
and wherein
the cured basecoat film represents at least partially the uppermost coat of the coating system produced.

2. The method as claimed in claim 1, wherein the polyether (b) possesses a number-average molecular weight of 650 to 4000 g/mol.

3. The method as claimed in claim 1, wherein the group R of the general structural formula (II) comprises tetramethylene radicals.

4. The method as claimed in claim 1, wherein components (a) and (b) are used in a molar ratio of 0.45/1 to 0.55/1.

5. The method as claimed in claim 1, wherein the polyether-based reaction product possesses a number-average molecular weight of 1500 to 15000 g/mol.

6. The method as claimed in claim 1, wherein the basecoat material further comprises at least one polyurethane resin which is grafted with olefinically unsaturated monomers and which further contains hydroxyl groups, and also comprises a melamine resin.

7. The method as claimed in claim 1, wherein the basecoat material is a one-component basecoat material.

8. The method as claimed in claim 1, wherein the tetracarboxylic dianhydride (a) is pyromellitic dianhydride, cyclobutanetetracarboxylic dianhydride, benzophenonetetracarboxylic dianhydride, bicyclooctenetetracarboxylic dianhydride or diphenyl sulfone tetracarboxylic dianhydride.

9. The method as claimed in claim 1, wherein said substrate used is a metallic substrate or a plastics substrate.

10. The method as claimed in claim 1, wherein the substrate is a metallic substrate and before the basecoat material is applied to the substrate, a cured electrocoat system and optionally a cured primer-surfacer coating is produced.

11. The method as claimed in claim 1, wherein after the basecoat material has been applied, at least one clearcoat material is applied and the basecoat material and clearcoat material are cured jointly.

12. The method as claimed in claim 1, wherein the basecoat material is cured at 70 to 120° C.

13. The method as claimed in claim 1, wherein the reaction product has an acid number of 10 to 70 mg KOH/g.

14. A coated substrate which can be produced by the method as claimed in claim 1.

15. A method of improving mechanical stability of a coating system, the method comprising incorporating a pigmented aqueous basecoat material comprising about 0.1 wt % to about 10 wt % of a carboxy-functional, polyether-based reaction product which is prepared by reaction of
(a) at least one cyclic tetracarboxylic dianhydride having an aliphatic, aromatic or araliphatic radical X which bridges the two anhydride groups,
with
(b) at least one polyether of a general structural formula (II)

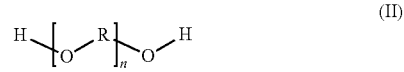

in which
R is a $C_3$ to $C_6$ alkylene radical and n is selected such that the polyether (b) possesses a number-average molecular weight of 500 to 5000 g/mol, wherein carboxyl groups formed after ring opening of the at least one cyclic tetracarboxylic dianhydride are substantially retained and not further reacted;
wherein components (a) and (b) are used in the reaction in a molar ratio of 0.7/2.3 to 1.6/1.7 and a resulting reaction product possesses an acid number of 5 to 80 mg KOH/g.

* * * * *